No. 714,144. Patented Nov. 25, 1902.
L. M. CHAPMAN.
CLAMP FOR ROPES, STRAPS, CHAINS, &c.
(Application filed July 26, 1901.)
(No Model.)

Witnesses:
Harold S. Barrett
Edw. Barrett.

Inventor
Leo M. Chapman
By L. H. Hopkins Atty.

UNITED STATES PATENT OFFICE.

LEO M. CHAPMAN, OF CHICAGO, ILLINOIS, ASSIGNOR, BY MESNE ASSIGNMENTS, OF TWO-THIRDS TO THE SAFETY LOCK SNAP MANUFACTURING COMPANY, A CORPORATION OF ILLINOIS.

CLAMP FOR ROPES, STRAPS, CHAINS, &c.

SPECIFICATION forming part of Letters Patent No. 714,144, dated November 25, 1902.

Application filed July 26, 1901. Serial No. 69,778. (No model.)

*To all whom it may concern:*

Be it known that I, LEO M. CHAPMAN, a citizen of the United States, residing at Chicago, in the county of Cook and State of Illinois, have invented certain new and useful Improvements in Clamps for Ropes, Straps, Chains, &c., of which the following is a specification.

The present invention relates to a device which is adapted to be secured to a rope or the like—say to one end thereof—and which has means for engaging and clamping or similarly taking hold of the rope at a point intermediate of its ends, so that the part of the rope thus engaged is prevented from slipping relatively to the clamp. A halter or hitching-strap is a familiar example of such a device; but I desire to have it understood that the invention relates to and is concerned with the clamp itself and is not limited to any particular use to which the clamp and its accompanying rope, strap, chain, or other device is put. As above intimated, it may be used on a halter or hitching-strap, or it may be used on a rein for attaching it to the bridle-bit, or a bundle-carrier, or a shawl-strap, or a bale-tie, or, in fact, on any rope or the like which it is desired to make fast.

For the sake of brevity the term "rope" will be used in the following description and the claims, but always with the understanding that I regard ropes, straps, chains, and the like as equivalents of each other.

Figure 1:
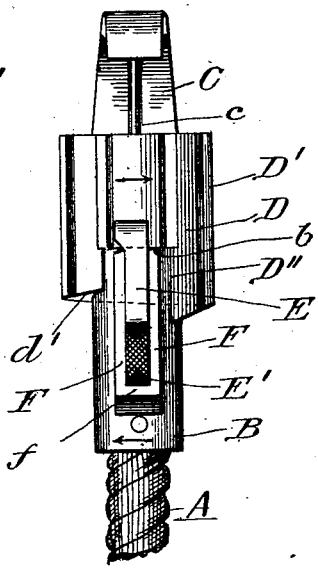
Figure 2:
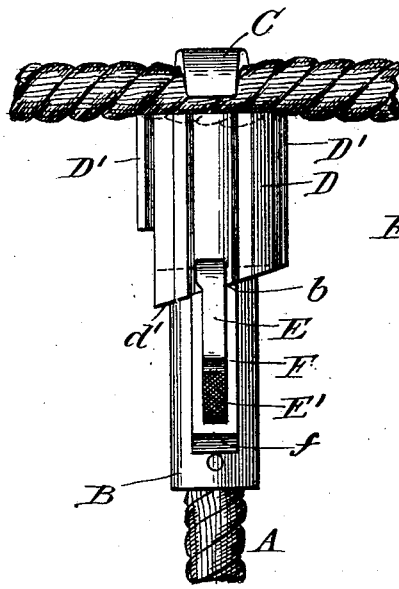
Figure 3:
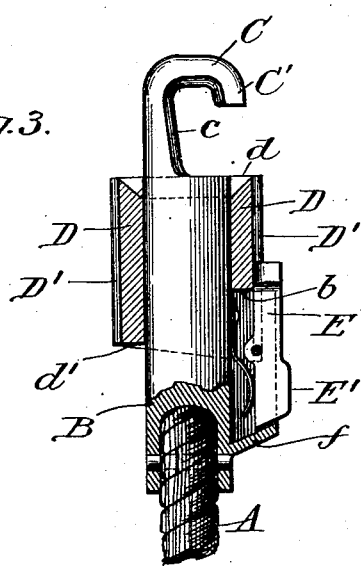
Figure 4:
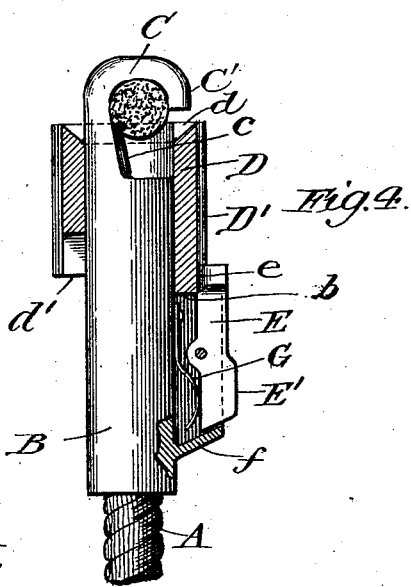
Figure 5:
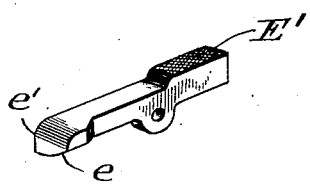

In the accompanying drawings, which are made a part of this specification, Figures 1 and 2 are elevations of a clamp embodying the invention, the former showing the jaws open and in readiness to receive between them the rope to be clamped and the latter showing a piece of the rope between the jaws and clamped thereby. Figs. 3 and 4 are sectional elevations thereof on the lines 3 3, Fig. 1, and 4 4, Fig. 2, respectively. Fig. 5 is a perspective view of the pawl for holding the jaws in clamping relations to each other.

A is a fragment of the rope, which may be of any desired length. One of its ends is secured by any suitable means to one of two relatively revoluble members. This member B preferably consists of a cylindrical body having at the end opposite that to which the rope is attached an overhanging hook C, which constitutes one jaw of the clamp. Preferably said jaw is provided on its inner face with a rib $c$, which is adapted to bite the rope and prevent it from slipping. The other of the two relatively revoluble members is preferably in the form of a sleeve D, which surrounds the member B, so that the two are capable of turning relatively to each other. The end $d$ of the sleeve D which is adjacent to the jaw C constitutes the other of the two clamping-jaws and is preferably flared, as shown, in order to avoid sharp corners, that would be liable to chafe or cut the rope, and at the same time allow the rope to be drawn into the end of the sleeve when forcibly clamped between the jaws. The opposite end $d'$ of the sleeve is helical and constitutes a cam, which is adapted to engage a projection or shoulder $b$ on the member B, so that when the two members are turned relatively to each other in the directions of the arrows placed on them the jaws will be moved toward each other, the pitch of the cam being such that the jaws may be closed with sufficient force to absolutely and positively prevent the rope which they clamp from slipping under any strains to which it will be put in ordinary use.

For the purpose of preventing accidental retrograde movement of the two members—*i. e.*, their relative rotation in the directions opposite those indicated by the arrows—which would allow the jaws to open and release the rope, one of said members (preferably the member B) carries a pawl E and the other carries a ratchet. The ratchet is in the form of longitudinal ribs D'. The pawl is disposed between flanges F, which are rigid with the member B, and the space inclosed by said flanges is closed at its end, as shown at $f$, in order to prevent substances that would interfere with its operation from getting beneath the pawl. The pawl is pivotally supported, and its toe is chamfered on one side, as shown at $e$, and abrupt on the other side, as shown at $e'$. The chamfered side permits the pawl to automatically ride over the ribs as the members are turned in the direction of the arrows, and in doing so overcomes the resistance of a spring G which is placed beneath it and by which it is normally held in engaging position. The abrupt side engages the side of the last rib, which it passes in the process of closing the jaws and, as before stated, prevents retrograde movement. For disengaging the pawl its heel end is provided with a roughened projection E′, adapted to receive pressure whereby the toe is lifted in opposition to the spring.

For the purpose of permitting a quick movement of the jaws toward each other and bringing them in contact with the rope when the latter is first placed between them and before their movement toward each other requires the exercise of any considerable amount of force the sleeve D is provided between the termini of the cam $d'$ with a notch D″, which receives the shoulder $b$ and the flanges F within it and allows the two members to be moved endwise relatively to each other. This movement brings the jaws into contact with the rope, and their further movement for forcibly clamping the rope is produced by turning them relatively to each other in the manner already described.

The depending portion C′ of the jaw C is in line with the end $d$ of the sleeve D, and the length of the sleeve at the finishing terminus of the cam $d'$ is slightly greater than the distance between the extremity of said depending portion C′ and the shoulder $b$, so that the said depending portion and shoulder form a stop for limiting the relative movement of the members B and D.

Having thus described my invention, what I claim as new therein, and desire to secure by Letters Patent, is—

1. In a clamp, the combination of two relatively revoluble members, arranged one upon the other and having clamping-jaws, the end of one of said members being helical, and a projection carried by the other of said members and adapted to engage said helical end, whereby when the members are turned relatively to each other the jaws will be forced toward each other, substantially as described.

2. In a clamp, the combination of two relatively revoluble members arranged one upon the other and having clamping-jaws, a cam carried by one of said members, means carried by the other of said members for engaging the cam, whereby when said members are turned relatively to each other the jaws will be forced toward each other, and means for preventing accidental retrograde movement of said members, substantially as described.

3. In a clamp, the combination of two relatively revoluble members arranged one upon the other and having clamping-jaws, a cam carried by one of said members, means carried by the other of said members for engaging the cam, a pawl carried by one of said members and a ratchet carried by the other of said members, substantially as described.

4. In a clamp the combination of two relatively revoluble members arranged one upon the other and having clamping-jaws, a cam carried by one of said members, means carried by the other of said members for engaging the cam, longitudinal ribs carried by one of said members and a spring-actuated pawl carried by the other of said members, the toe of said pawl being chamfered on one side and abrupt on the other, substantially as described.

5. In a clamp, the combination of two relatively revoluble members mounted one upon the other and having clamping-jaws, one of said members having a longitudinal slot, a cam carried by said slotted member and a projection carried by the other member and adapted to engage said cam when the members are rotated relatively to each other, or to enter said slot, and permit the relative endwise movement of said members, substantially as described.

6. In a clamp, the combination of the member B having an overhanging clamping-jaw, the sleeve D mounted to both turn and slide thereon and having a clamping-jaw, a shoulder $b$ on the member B, a cam $d'$ on the sleeve D, and means for preventing the retrograde movement of the parts, the sleeve being provided between the termini of the cam with a notch for receiving the shoulder $b$, substantially as described.

7. In a clamp, the combination of the member B having the overhanging clamping-jaw C, the sleeve D surrounding the member B and having a clamping-jaw, longitudinal ribs on the sleeve D, a shoulder $b$ on the member B, the flanges F the pawl E arranged between the flanges F and pivoted to them, and a spring arranged between the flanges and engaging the pawl, substantially as described.

8. In a clamp, the combination of the member B having the overhanging jaw C, the sleeve D surrounding it and carrying a clamping-jaw, the sleeve being flared in the vicinity of the clamping-jaw, a cam carried by the sleeve, and means carried by the other member for engaging the cam, substantially as described.

LEO M. CHAPMAN.

Witnesses:
SCOTT GRIFFIN,
W. MORRISON.